US 8,010,977 B2

(12) United States Patent
Hogyoku

(10) Patent No.: US 8,010,977 B2
(45) Date of Patent: Aug. 30, 2011

(54) BROADCAST RECEIVING APPARATUS AND PAY PROGRAM PROVIDING SYSTEM

(75) Inventor: Itaru Hogyoku, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 591 days.

(21) Appl. No.: 12/131,714

(22) Filed: Jun. 2, 2008

(65) Prior Publication Data

US 2009/0031373 A1 Jan. 29, 2009

(30) Foreign Application Priority Data

Jul. 26, 2007 (JP) ................................. 2007-194476

(51) Int. Cl.
*H04N 7/167* (2011.01)
*H04N 7/16* (2011.01)
*H04N 9/80* (2006.01)

(52) U.S. Cl. ............ 725/31; 725/25; 725/134; 725/104; 386/248

(58) Field of Classification Search .......................... None
See application file for complete search history.

(56) References Cited

U.S. PATENT DOCUMENTS

| 5,991,400 | A * | 11/1999 | Kamperman | 380/239 |
| 6,802,077 | B1 * | 10/2004 | Schlarb | 725/104 |
| 6,961,430 | B1 * | 11/2005 | Gaske et al. | 380/216 |
| 7,362,960 | B2 * | 4/2008 | Ino et al. | 386/239 |
| 2002/0162104 | A1 * | 10/2002 | Raike et al. | 725/31 |
| 2004/0117841 | A1 | 6/2004 | Urakoshi | |
| 2004/0177369 | A1 * | 9/2004 | Akins, III | 725/31 |
| 2006/0265731 | A1 * | 11/2006 | Matsuda | 725/131 |
| 2007/0130068 | A1 * | 6/2007 | Kitazato et al. | 705/50 |

FOREIGN PATENT DOCUMENTS

| CN | 1529984 A | 9/2004 |
| JP | 2004-208198 A | 7/2004 |
| JP | 2005-311571 | 11/2005 |
| JP | 2005-333402 A | 12/2005 |

* cited by examiner

*Primary Examiner* — Joseph P Hirl
*Assistant Examiner* — Fred Peng
(74) *Attorney, Agent, or Firm* — Nixon & Vanderhye P.C.

(57) ABSTRACT

A broadcast receiving apparatus receives a broadcast signal containing video image information representing a video image, pay program identifying information indicating whether or not the video image is a pay program video image, and address information indicating a predetermined communications server, the broadcast signal containing the video image information, the pay program identifying information, and the address information in a predetermined format. The broadcast receiving apparatus has: a display portion displaying the video image; a pay program judging portion judging whether or not the video image information is pay program video image information based on the pay program identifying information; and a recording portion recording the video image information. If the pay program judging portion judges that the video image information is pay program video image information, the recording portion records the address information in addition to the video image information. A pay program providing system includes the broadcast receiving apparatus. Thus, provided are the broadcast receiving apparatus and the pay program providing system that, without hampering collection of a viewing fee, make it easy for a viewer to record a pay program without the need for making a subscription agreement or the like in advance.

12 Claims, 12 Drawing Sheets

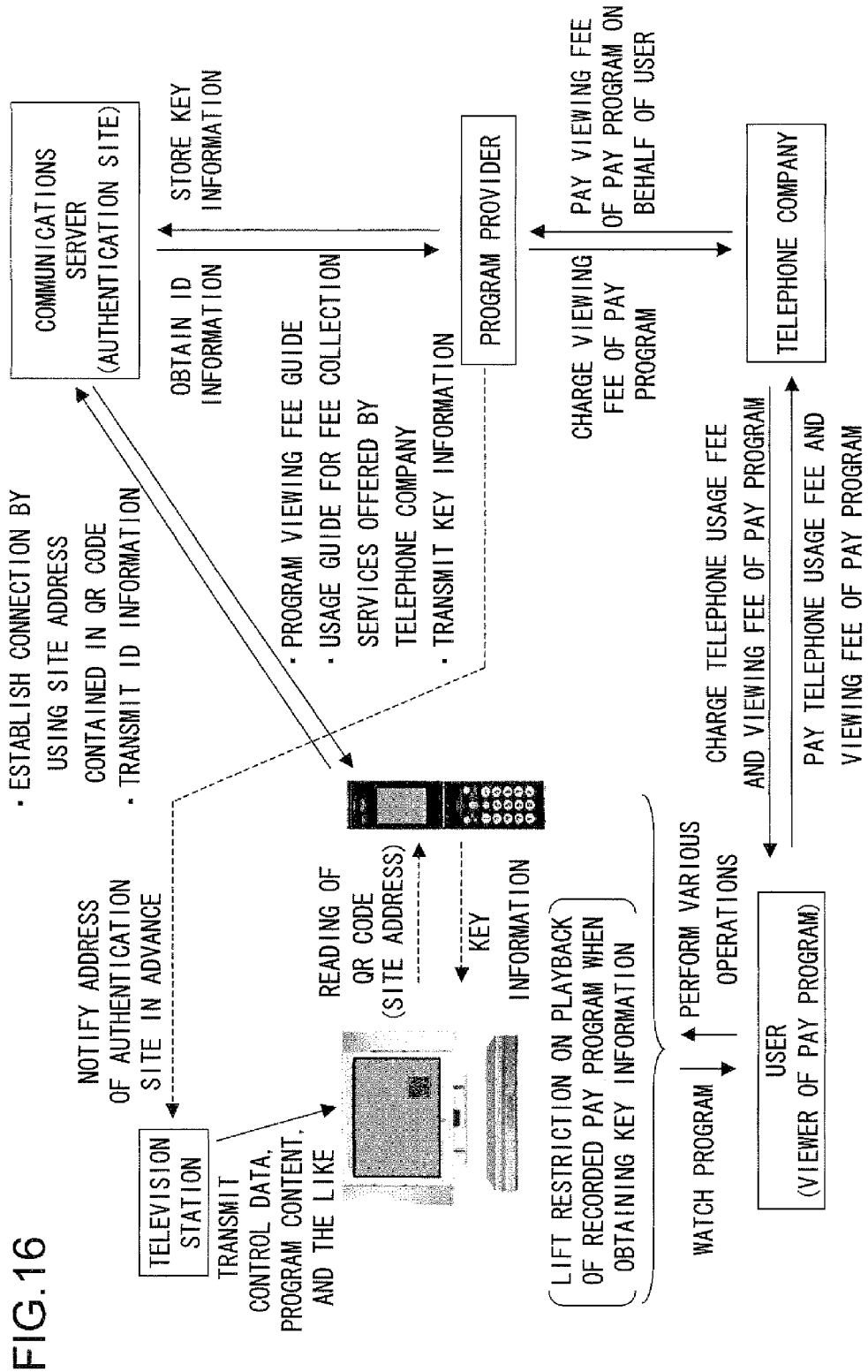

BROADCAST RECEIVING APPARATUS AND PAY PROGRAM PROVIDING SYSTEM

This nonprovisional application claims priority under 35 U.S.C. §119(a) on Patent Application No. 2007-194476 filed in Japan on Jul. 26, 2007, the entire contents of which are hereby incorporated by reference.

BACKGROUND OF THE INVENTION

1. Field of the Invention

The present invention relates to broadcast receiving apparatuses that receive broadcast signals, and to provide pay program providing systems using such broadcast receiving apparatuses.

2. Description of Related Art

Currently, a fee-based service whereby a broadcast program is provided for a fee (pay program providing service) is available. Such a service is generally based on the assumption that a viewer makes a subscription agreement with a program provider in advance, such that, for example, the program provider ensures collection of a viewing fee. For example, a pay program is not allowed to be watched and recorded until the viewer makes a subscription agreement with the program provider. Depending on the contents of the subscription agreement, a certain amount of money may be collected as a viewing fee every month, or the viewer may be required in advance to select a program to be watched, such that the viewer is charged a viewing fee for that program. An example of a document related to what has been described thus far is JP-A-2005-311571.

The above-described conventional method makes it possible to collect the viewing fee almost unfailingly, because the party from which the viewing fee should be collected is known by the contents of the subscription agreement. However, this method is often inconvenient in particular for the viewer, because it is based on the assumption that the viewer makes a subscription agreement with the program provider in advance.

For example, with the above-described method, the viewer is required to make a subscription agreement about a pay program in advance to record the pay program and play it back later. As a result, the following problems arise. If the pay program will be broadcast soon (for example, 10 minutes later), the viewer fails to make a subscription agreement about the pay program in time, and therefore cannot record the pay program and play it back later. On the other hand, however, if the viewer is allowed to record any pay program and play it back without any inhibition, the pay program provider may find it difficult to collect the viewing fee.

SUMMARY OF THE INVENTION

In view of the conventionally experienced problems described above, an object of the present invention is to provide broadcast receiving apparatuses and pay program providing systems that, without hampering collection of a viewing fee, make it easy for a viewer to record a pay program without the need for making a subscription agreement or the like in advance.

To achieve the above object, according to one aspect of the present invention, a broadcast receiving apparatus receiving a broadcast signal containing video image information representing a video image, pay program identifying information indicating whether or not the video image is a pay program video image, and address information indicating a predetermined communications server, the broadcast signal containing the video image information, the pay program identifying information, and the address information in a predetermined format, is provided with: a display portion displaying the video image; a pay program judging portion judging whether or not the video image information is pay program video image information based on the pay program identifying information; and a recording portion recording the video image information. If the pay program judging portion judges that the video image information is pay program video image information, the recording portion records the address information in addition to the video image information.

With this configuration, at the time of playback of a recorded video image (a video image recorded in the recording portion) of a pay program, it is possible to display the address information. This makes it easy to restrict playback of the recorded video image until, for example, the user is made to make access to a communications server managed by a pay program provider and obtain a key to lifting the restriction from the communications server. As a result, the pay program provider can easily collect a viewing fee by obtaining information that identifies the user or the like in exchange for the key to lifting the restriction. In addition, the user is allowed to record the pay program even when no subscription agreement or the like is made in advance.

Preferably, in the configuration described above, the broadcast receiving apparatus is further provided with: a QR code producing portion producing, based on the address information, a QR code (registered trademark) indicating the address information; a video image playback portion making the display portion play back the video image of the video image information recorded in the recording portion according to a playback start instruction; and a pay program guide displaying portion producing a display of a predetermined pay program guide image if the video image to be played back is a pay program video image. Here, the pay program guide displaying portion produces a display of the pay program guide image including the QR code.

With this configuration, at the time of playback of a recorded video image of a pay program, the QR code indicating the address information is displayed. This makes it possible for the user to make access to the communications server by using the communications terminal that can read the QR code.

Preferably, in the configuration described above, if the video image to be played back is a pay program video image, the video image playback portion temporarily suspends playback of the video image.

With this configuration, it is possible to urge the user to make access to the communications server by adopting, for example, a configuration in which a suspension of playback is lifted only when the broadcast receiving apparatus receives a key to lifting a suspension, the key being held by the communications server.

Preferably, in the configuration described above, the pay program guide displaying portion produces a display in which the pay program guide image is superimposed on a whole or part of the video image of the video image information.

With this configuration, it is possible to urge the user to make access to the communications server by adopting, for example, a configuration in which a display of the pay program guide image is stopped only when the broadcast receiving apparatus receives a key to stopping the display, the key being held by the communications server.

Preferably, in the configuration described above, the pay program guide displaying portion produces a display of the pay program guide image including an image for notifying a user that the video image to be played back is a pay program video image.

With this configuration, it is possible to make the user recognize the current situation, and minimize the chances of the user mistakenly believing that, for example, a playback is entirely free of charge.

Preferably, in the configuration described above, the broadcast receiving apparatus receives a broadcast signal containing video image information representing a video image, pay program identifying information indicating whether or not the video image is a pay program video image, address information indicating a predetermined communications server, and information indicating the type of pay program, the broadcast signal containing the video image information, the pay program identifying information, the address information, and the information indicating the type of pay program in a predetermined format. Here, the pay program guide displaying portion has a notification image corresponding to the type of pay program. The pay program guide displaying portion produces a display of the pay program guide image including the notification image.

With this configuration, it is easy to appropriately display information that vary from one program to another, such as program's name and viewing fee. This makes it easy to provide the user with more accurate information of a pay program to be played back.

Preferably, in the configuration described above, the broadcast receiving apparatus receives a broadcast signal containing video image information representing a video image, pay program identifying information indicating whether or not the video image is a pay program video image, address information indicating a predetermined communications server, and information representing a notification image corresponding to the type of pay program, the broadcast signal containing the video image information, the pay program identifying information, the address information, and the information representing a notification image corresponding to the type of pay program in a predetermined format. Here, the pay program guide displaying portion produces a display of the pay program guide image including the notification image.

With this configuration, it is easy to appropriately display information that vary from one program to another, such as program's name and viewing fee. This makes it easy to provide the user with more accurate information of a pay program to be played back.

More specifically, in the configuration described above, the notification image may include at least an image indicating a name and a viewing fee of a pay program.

According to another aspect of the present invention, a pay program providing system is provided with: the broadcast receiving apparatus having the configuration described above; a communications terminal that can read a QR code, and that stores identifiable information by which an individual or organization can be identified; and a communications server having a key required to lift a suspension of playback. Here, the pay program providing system performs a first step in which the communications terminal reads the QR code displayed by the broadcast receiving apparatus, and makes access to a communications server identified by the address information, a second step in which the communications server transmits the key to the communications terminal only when the communications server receives the identifiable information from the communications terminal, a third step in which the communications terminal transmits the key to the broadcast receiving apparatus, and a fourth step in which the broadcast receiving apparatus lifts a suspension of playback when obtaining the key.

With this configuration, the pay program provider can easily collect a viewing fee of a pay program by obtaining the identifiable information via the communications server. In addition, the user is allowed to record a video image information of a pay program even when no subscription agreement or the like is made in advance as long as the key is transmitted from the communications server to the broadcast receiving apparatus via the communications terminal. It is to be noted that, until the communications server receives the identifiable information from the communications terminal, the broadcast receiving apparatus is not allowed to obtain the key and hence lift a suspension of playback. This makes it possible to prevent a suspension of playback from being lifted before the communications server obtains the identifiable information.

According to still another aspect of the present invention, a pay program providing system is provided with: the broadcast receiving apparatus having the configuration described above; a communications terminal that can read a QR code, and that stores identifiable information by which an individual or organization can be identified; and a communications server having a key required to stop a display of the pay program guide image. Here, the pay program providing system performs a first step in which the communications terminal reads the QR code displayed by the broadcast receiving apparatus, and makes access to a communications server identified by the address information, a second step in which the communications server transmits the key to the communications terminal only when the communications server receives the identifiable information from the communications terminal, a third step in which the communications terminal transmits the key to the broadcast receiving apparatus, and a fourth step in which the broadcast receiving apparatus stops a display of the pay program guide image when obtaining the key.

With this configuration, the pay program provider can easily collect a viewing fee of a pay program by obtaining the identifiable information via the communications server. In addition, the user is allowed to record a video image information of a pay program even when no subscription agreement or the like is made in advance as long as the key is transmitted from the communications server to the broadcast receiving apparatus via the communications terminal. It is to be noted that, until the communications server receives the identifiable information from the communications terminal, the broadcast receiving apparatus is not allowed to obtain the key and hence stop a display of the pay program guide image (that is, the entire area of the recorded video image is not displayed). This makes it possible to prevent a display of the pay program guide image from being stopped before the communications server obtains the identifiable information.

According to still another aspect of the present invention, a pay program providing system is provided with: the broadcast receiving apparatus having the configuration described above, the broadcast receiving apparatus receiving a broadcast signal containing video image information representing a scrambled video image, pay program identifying information indicating whether or not the video image is a pay program video image, and address information indicating a predetermined communications server, the broadcast signal containing the video image information, the pay program identifying information, and the address information in a predetermined format; a communications terminal that can read a QR code, and that stores identifiable information by which an individual or organization can be identified; and a communications server having a key required to descramble the video image. Here, the pay program providing system performs a first step in which the communications terminal reads the QR code displayed by the broadcast receiving apparatus, and makes access to a communications server identified by the address information, a second step in which the communications server transmits the key to the communications terminal only when the communications server receives the identifiable information from the communications terminal, a third step in which the communications terminal transmits the key to the broadcast receiving apparatus, and a fourth step in which the broadcast receiving apparatus descrambles the video image by using the key.

With this configuration, the pay program provider can easily collect a viewing fee of a pay program by obtaining the identifiable information via the communications server. In addition, the user is allowed to record a video image information of a pay program even when no subscription agreement or the like is made in advance as long as the key is transmitted from the communications server to the broadcast receiving apparatus via the communications terminal. It is to be noted that, until the communications server receives the identifiable information from the communications terminal, the broadcast receiving apparatus is not allowed to obtain the key and hence descramble the video image. This makes it possible to prevent the scrambled video image from being descrambled before the communications server obtains the identifiable information.

Preferably, in the configuration described above, the communications terminal is a cellular phone owned by a subscriber making an agreement with a telephone company about the use of a communication line, and the identifiable information is information by which the subscriber can be identified. With this configuration, the pay program provider can charge the subscriber of the cellular phone a viewing fee.

Preferably, in the configuration described above, the identifiable information is ID information unique to the communications terminal. With this configuration, if the owner or the like of each communications terminal is previously known, the pay program provider can charge the owner or the like a viewing fee.

Preferably, in the configuration described above, the communications terminal performs a decision process for making a user decide whether to transmit the identifiable information to the communications server. With this configuration, the user is allowed to decide on their own whether to transmit the identifiable information to the communications server.

Preferably, in the configuration described above, if the first step is performed, the communications server transmits software to the communications terminal, and the software makes the communications terminal perform the decision process. With this configuration, it is possible to realize the decision process by software. In addition, since the communications terminal is not required to always hold the software, it is possible to minimize an increase in storage capacity.

Preferably, in the configuration described above, the software makes the communications terminal perform a process for making the user decide whether to agree to pay a viewing fee of a pay program. With this configuration, the user is allowed to decide on their own whether to agree to pay a viewing fee of a pay program.

Preferably, in the configuration described above, the software makes the communications terminal display an image for notifying the user that the viewing fee of the pay program can be paid by using fee collection services offered by a cellular phone company. Furthermore, in the configuration described above, the identifiable information obtained by the communications server may be used for collecting the viewing fee of the pay program.

The viewing fee of the pay program may be collected by using the identifiable information as follows. For example, in a case where the communications terminal is a cellular phone, the viewing fee may be collected by using fee collecting services offered by the cellular phone company, by using credit services offered by a business partner of the cellular phone company, or by using electronic money services offered by a business partner of the cellular phone company.

More specifically, in the configuration described above, in the third step, transmission of the key may be performed via infrared communication using an IrDA interface. Furthermore, the key may be an encrypted key, and the broadcast receiving apparatus may decrypt the encrypted key.

According to still another aspect of the present invention, a pay program providing system is provided with: a broadcast station broadcasting a video signal of a pay program; a broadcast receiving apparatus receiving the video signal and recording the video signal thus received, and displaying a video image based on the video signal; and a communications server that can communicate with a communications device. The broadcast receiving apparatus includes a restricting portion imposing a restriction on a display of the video image by a predetermined method and a lifting portion lifting the restriction by obtaining a predetermined key. Here, the communications server transmits the key to the communications device.

With this configuration, the viewer is allowed to record a pay program with the broadcast receiving apparatus even when no subscription agreement or the like is made in advance. In addition, the pay program provider having the communications server can easily obtain, in exchange for the transmission of the key to the communications device owned by the viewer or the like, the information that identifies the party from which the viewing fee should be collected.

More specifically, in the configuration described above, the restricting portion may impose the restriction by a first method by which a display of the video image is suspended, or a second method by which the video image is displayed with a predetermined image being superimposed on a whole or part thereof. If the restriction is imposed by the first method, the lifting portion may lift a suspension of the display of the video image; if the restriction is imposed by the second method, the lifting portion may lift the restriction by stopping a display of the predetermined image.

BRIEF DESCRIPTION OF THE DRAWINGS

This and other objects and features of the present invention will become clear from the following description, taken in conjunction with the preferred embodiments with reference to the accompanying drawings in which:

FIG. 16 is an explanatory diagram of the pay program providing system embodying the invention.

DETAILED DESCRIPTION OF PREFERRED EMBODIMENTS

Hereinafter, Examples 1 to 3 embodying the present invention will be described.

Example 1

Figure 1:
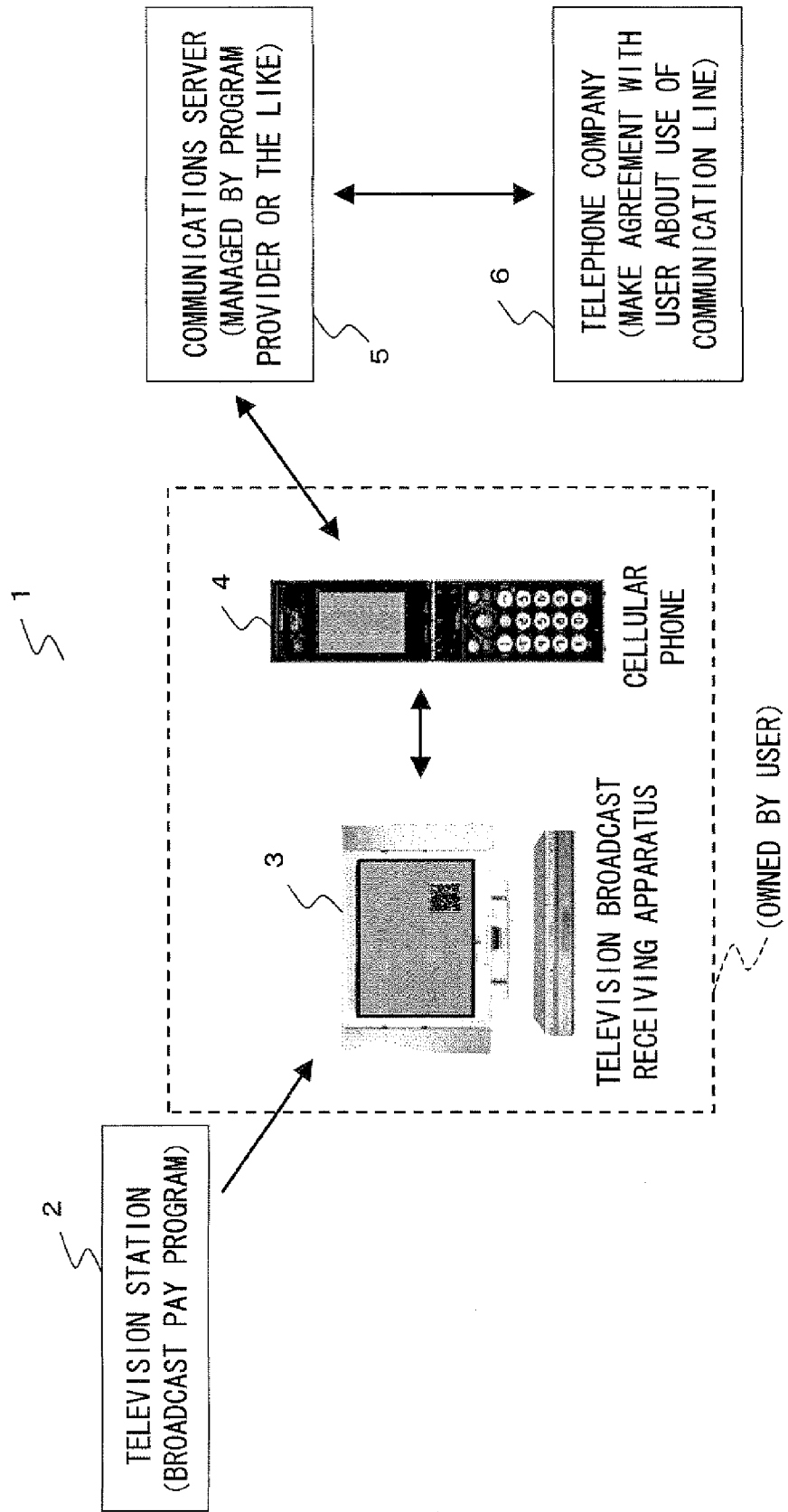
FIG. 1 is a diagram showing an outline of the configuration of a pay program providing system embodying the invention.

Example 1 of the present invention will be described, taking up as an example a pay program providing system. An outline of the configuration of this pay program providing system is shown in FIG. 1. As shown in this figure, a pay program providing system 1 includes a television station 2, a television broadcast receiving apparatus 3, a cellular phone 4, a communications server 5, and a telephone company 6. Here, assume that the television broadcast receiving apparatus 3 and the cellular phone 4 belong to the user.

First, the television station 2 will be described. The television station 2 broadcasts information (such as video data) related to the contents of a program produced by a program provider as a data stream by using an RF signal, for example. Here, with reference to FIG. 2, the data structure of the data stream will be explained.

Figure 2:
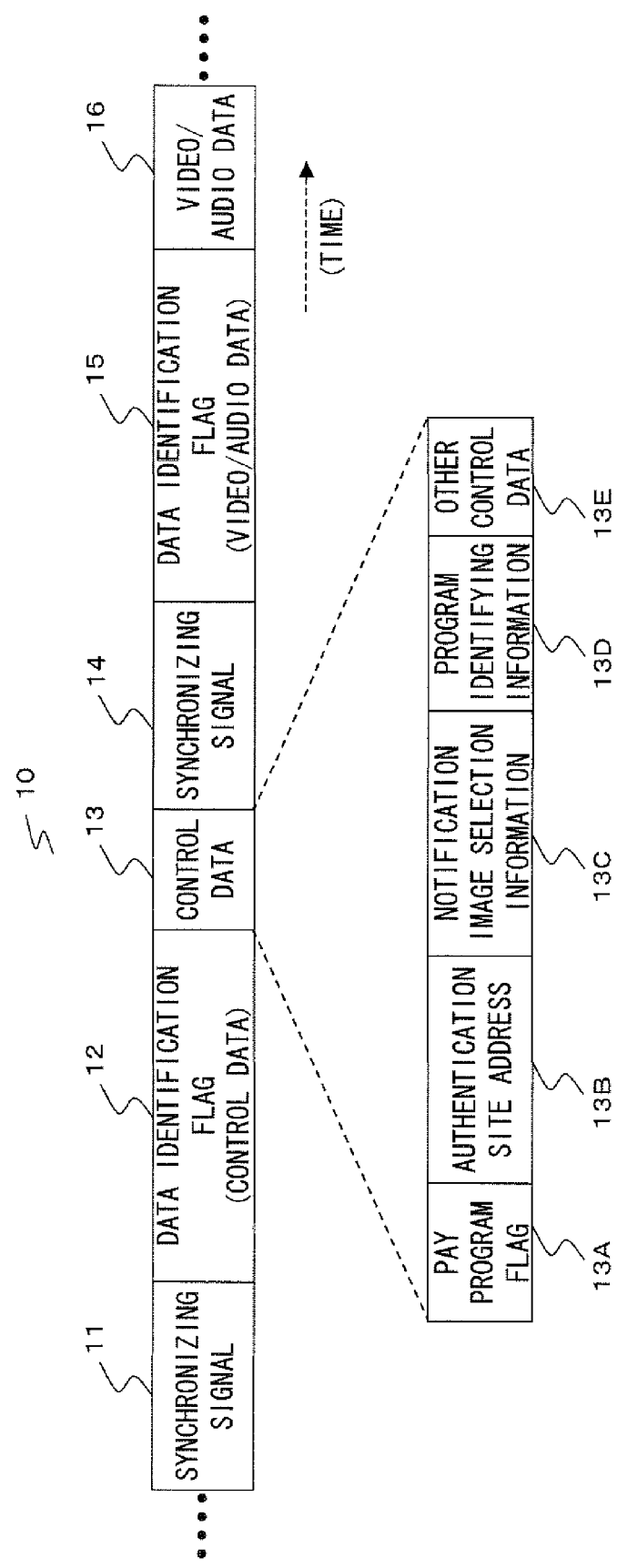
FIG. 2 is a diagram showing an outline of the structure of stream data described in Example 1 and the like of the invention.

As shown in FIG. 2, a data stream 10 consists of a synchronizing signal 11, a data identification flag 12, control data 13, a synchronizing signal 14, a data identification flag 15, and video/audio data 16. The synchronizing signals 11 and 14 each represent the start of data. The data identification flag 12 represents the presence of the following control data 13, and the data identification flag 15 represents the presence of the following video/audio data 16.

The control data 13 is information related to various types of control. Specifically, as shown in FIG. 2, the control data 13 includes a pay program flag 13A, an authentication site address 13B, notification image selection information 13C, program identifying information 13D, and other control data 13E.

The pay program flag 13A indicates whether the currently broadcast program is a pay program or not. The authentication site address 13B indicates an address for making access to an authentication site (Web page) at which authentication is performed to grant permission to watch the pay program. This authentication site is provided by the communications server 5.

The notification image selection information 13C is used for selection of a notification image, which will be described further below, and is provided one for each of the pay programs. Therefore, the notification image selection information 13C can be considered to indicate the type of pay program. The program identifying information 13D is information provided for identification of the type of a currently broadcast program, and is used by the communications server 5 to identify the key information to be transmitted. In the case of a broadcast signal of a free program, the authentication site address 13B, the notification image selection information 13C, and the program identifying information 13D may be dummy data.

The video/audio data 16 is data of video and audio related to the contents of a program. Even when the television broadcast is analog broadcasting, the above-described control data can be transmitted by superimposing a data signal on a scanning line during the vertical blanking time. That is, the equivalent of the above-described data stream 10 can be transmitted regardless of whether the television broadcast is digital or analog broadcasting.

Next, the television broadcast receiving apparatus (hereinafter the "receiving apparatus") 3 will be described. The receiving apparatus 3 receives a television broadcast transmitted from the television station 2, and can perform such operations as recording and playing back data related to a program. The configuration of the receiving apparatus 3 will be described below with reference to FIG. 3.

Figure 3:
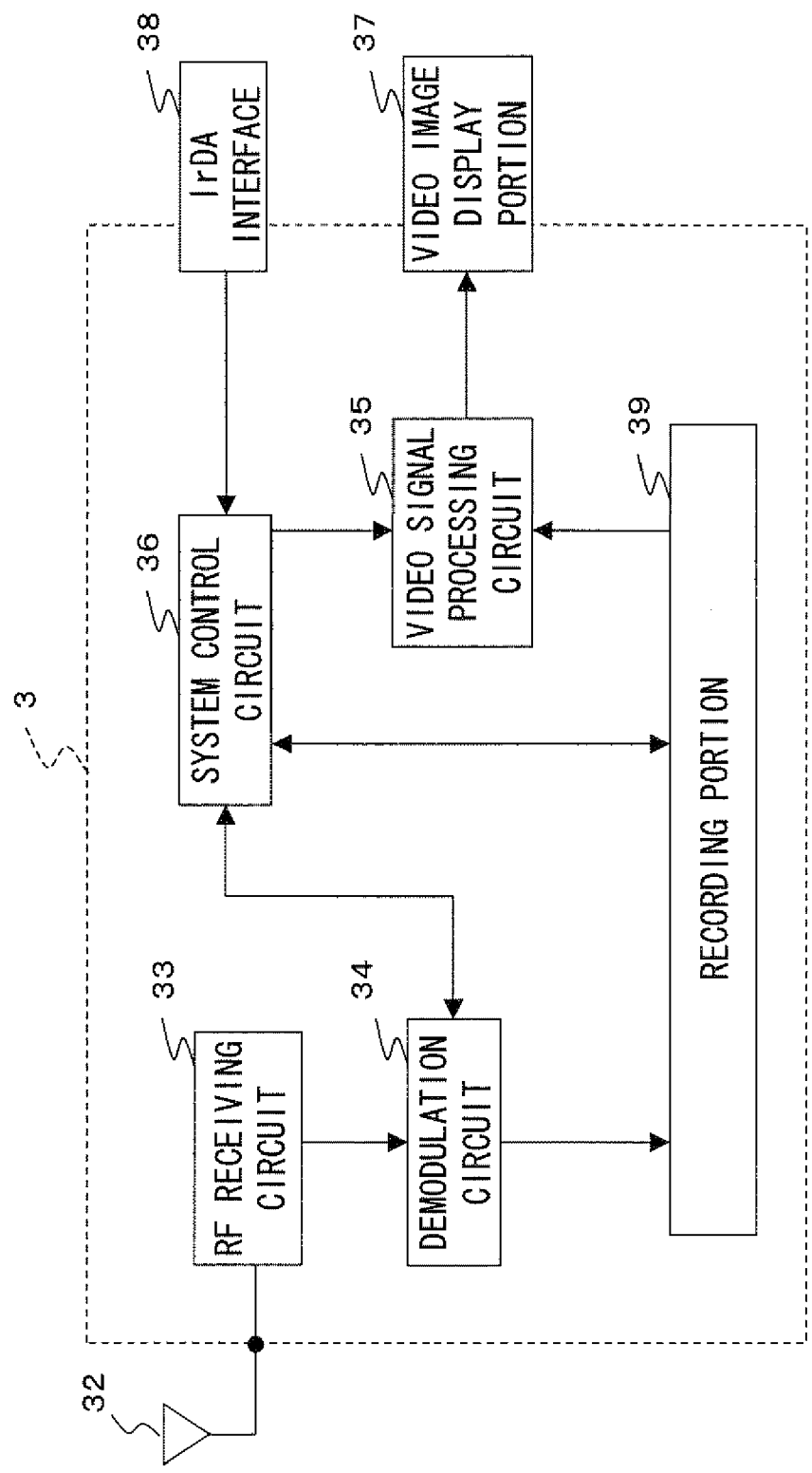
FIG. 3 is a configuration diagram of the television broadcast receiving apparatus embodying the invention.

As shown in FIG. 3, the receiving apparatus 3 is composed of an antenna 32, an RF receiving circuit 33, a demodulation circuit 34, a video signal processing circuit 35, a system control circuit 36, a video image display portion 37, an IrDA interface 38, a recording portion 39, and the like.

The RF receiving circuit 33 receives an RF signal (a signal of a television broadcast) obtained via the antenna 32, and transmits it to a circuit provided in the following stage. The RF receiving circuit 33 is provided with a tuner circuit, such that only a signal of a channel selected by the user is transmitted.

Based on the signal transmitted from the RF receiving circuit 33, the demodulation circuit 34 extracts video data and audio data (data based on the video/audio data 16) and control data 13. This extraction process is performed by referring to the synchronizing signal and the data identification flag in the above-described data stream. The video data and the audio data are transmitted to the recording portion 39 provided in the following stage, and the control data 13 is transmitted to the system control circuit 36 and the recording portion 39. It is to be noted that these processes can be performed regardless of whether the broadcast signal is a digital broadcast signal or an analog broadcast signal.

Based on the video data inputted from the recording portion 39 or the system control circuit 36, the video signal processing circuit 35 makes the video image display portion 37 display a video image. The video image display portion 37 has a video display device such as a cathode ray tube or a liquid crystal display.

Based on the inputted control data 13 or the like, the system control circuit 36 performs various types of control. In particular, when it is found out (based on the contents of the pay program flag 13A) that information of a pay program broadcast on a television and recorded in the recording portion 39 is about to be played back, based on the inputted authentication site address 13B and program identifying information 13D, the system control circuit 36 produces a QR code (registered trademark; hereinafter omitted) 17 containing the encoded contents of these information, and transmits it to the video signal processing circuit 35. It is to be noted that these processes may be performed only when a pay program is found to be currently received based on the pay program flag 13A, because there is no need to perform these processes for the reception of a free program.

Figure 9:
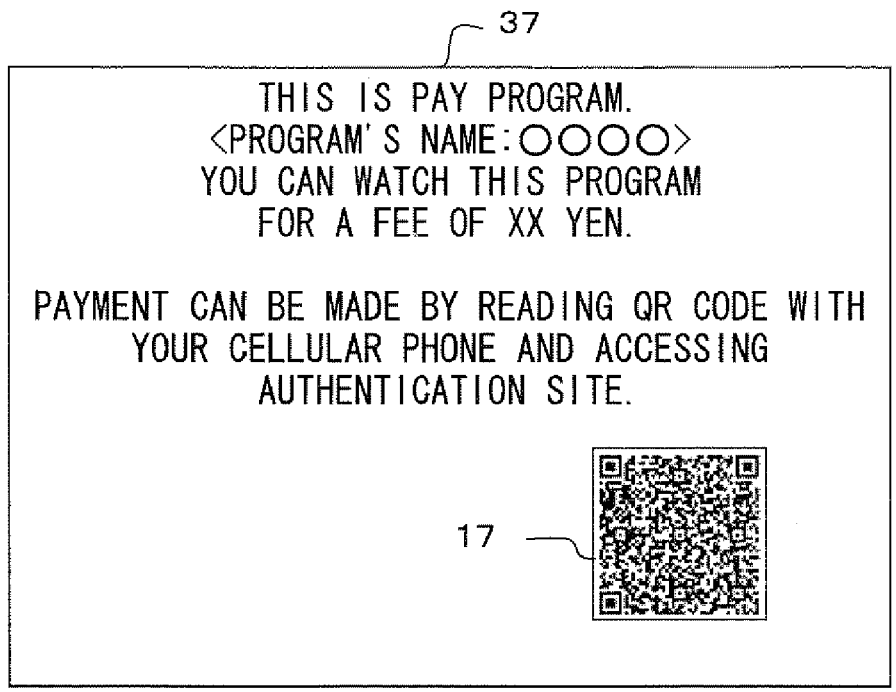
FIG. 9 is a diagram showing a screen display of the television broadcast receiving apparatus embodying the invention.

In addition, the system control circuit 36 stores a plurality of types of notification image such as an image (except for a portion corresponding to the QR code 17) shown in FIG. 9. This notification image notifies the user that a video image to be played back is a pay program video image, and notifies the user of the program's name, a viewing fee thereof, and the like. The plurality of types of notification images are provided because different types of pay programs have different program's names and viewing fees. At the time of reception of a broadcast signal, the system control circuit 36 checks whether or not the currently received program is a pay program based on the pay program flag 13A transmitted from the demodulation circuit 34. If the currently received program is found to be a pay program, the system control circuit 36 controls the control data 13, in addition to the video data and audio data, so as to be recorded in the recording portion 39.

The IrDA interface 38 performs infrared communication (IrDA communication) with the cellular phone 4 or the like. As will be described later, the receiving apparatus 3 can receive key information from the cellular phone 4 via the IrDA interface 38.

The recording portion 39 is composed of, for example, a hard disk (HD) recorder, a DVD recorder, or the like, and records the video data and audio data transmitted from the demodulation circuit 34. As described above, when the video data and the audio data related to the pay program is recorded, the corresponding control data 13 is recorded at the same time.

Though not illustrated, the receiving apparatus 3 has an audio output device for outputting audio based on the audio data of the video/audio data 16. In the receiving apparatus 3 configured as described above, the video and audio data (in the case of a pay program, the control data 13) is recorded in the recording portion 39 regardless of whether the received broadcast program is a pay program or not. The receiving apparatus 3 can play back the data thus recorded at a later time.

Figure 4:
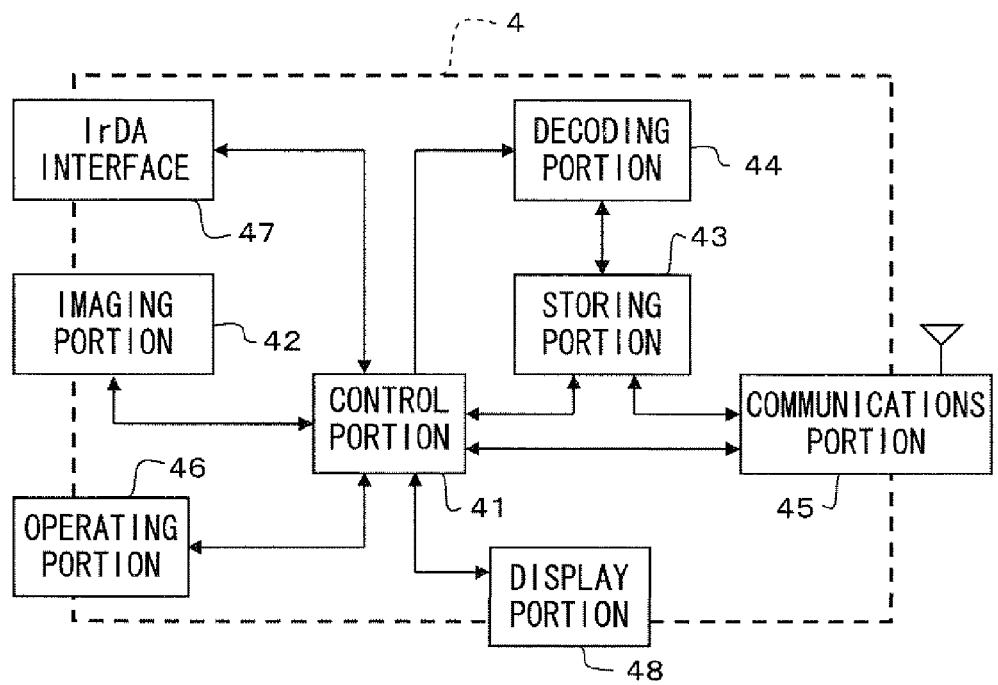
FIG. 4 is a configuration diagram of the cellular phone embodying the invention.

Next, the cellular phone 4 will be described. As shown in FIG. 4, the cellular phone 4 here includes, for example, a control portion 41, an imaging portion 42, a storing portion 43, a decoding portion 44, a communications portion 45, an operating portion 46, an IrDA interface 47, and a display portion 48.

The control portion 41 has a calculation control device, and controls the operations of different portions of the cellular phone 4. The imaging portion 42 has an image pickup device such as a CCD or a CMOS, and can obtain information about an optical image formed trough a lens. This makes it possible to obtain the information about the QR code displayed on the video image display portion of the receiving apparatus 3.

The storing portion 43 consists of a RAM or the like, and stores image data obtained by the imaging portion 42, various types of data received via the communications portion 45, ID information of the cellular phone 4, and the like. The ID information is unique information assigned to the cellular phone. The ID information may contain information such as information with which the cellular phone and its owner can be identified, or information with which a telephone company can be identified, the telephone company with which the owner of the cellular phone 4 has made an agreement about the use of a communication line. The decoding portion 44 performs decoding for the QR code stored in the storing portion 43, and puts the information such as the obtained address back to the storing portion 43.

The communications portion 45 has an antenna, and performs wireless communication (transmission and reception of an RF signal) with communications devices including the communications server 5. The operating portion 46 has, for example, a button switch, and obtains various types of instruction information reflecting the user's intention through the button operation. The IrDA interface 47 performs infrared communication (IrDA communication), and corresponds to the IrDA interface 38 of the receiving apparatus 3. The display portion 48 has a display, and performs various screen displays.

With this configuration, the cellular phone 4 can obtain the information in the QR code displayed by the receiving apparatus 3, and perform communication with the communications server 5 to which it is connected by using the address contained in that information.

Figure 5:
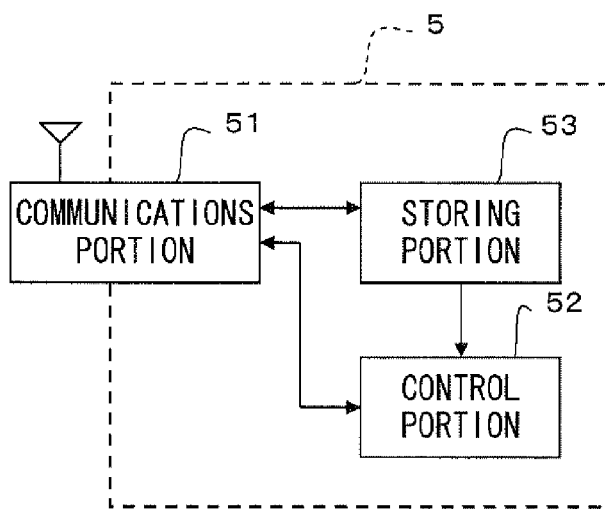
FIG. 5 is a configuration diagram of the communications server embodying the invention.

Next, the communications server 5 will be described. As shown in FIG. 5, the communications server 5 includes, for example, a communications portion 51, a control portion 52, and a storing portion 53, and is managed by, for example, a provider of the pay program. The communications portion 51 performs wireless communication (transmission and reception of an RF signal) with communications devices including the cellular phone 4. The control portion 52 controls different portions of the communications server 5.

The storing portion 53 previously stores information such as information for providing an authentication site for transmitting key information, if it is accessed from the cellular phone 4 or the like, in exchange for the ID information, information regarding the contents of the pay program and the viewing fee, and key information for lifting a suspension of playback of the recorded pay program in the receiving apparatus 3. In a case where the ID information or the like is transmitted from the cellular phone 4, the storing portion 53 stores it.

The telephone company 6 provides communication services associated with the cellular phones, and makes an agreement with the owner of the cellular phone 4 in advance about the communication services. The telephone company 6 provides the owner of the cellular phone 4 with the communication services or the like associated with the cellular phone 4, and collects a communication fee by taking the amount from the bank account of the owner, for example.

Figure 6:
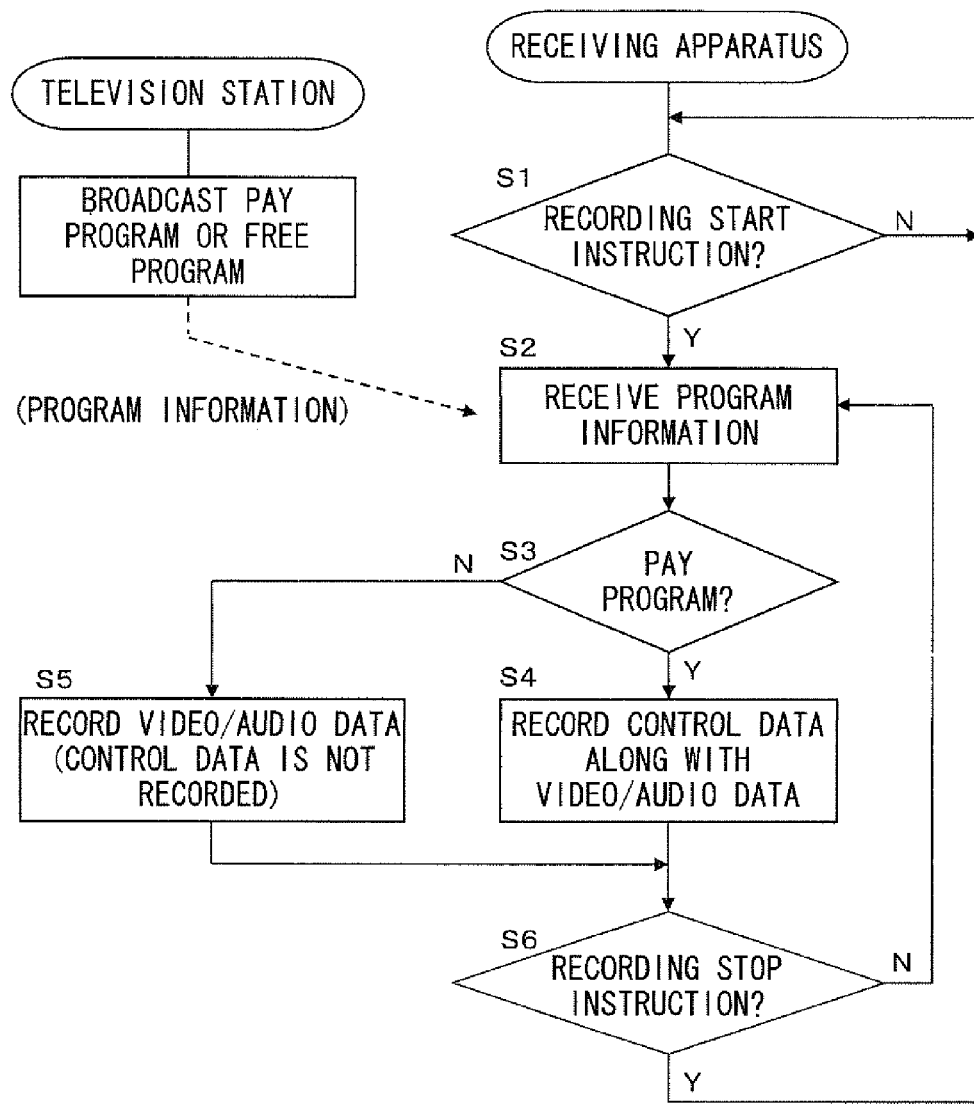
FIG. 6 is a flow chart showing the procedures for recording information contained in a broadcast signal.

Next, with reference to the flow chart shown in FIG. 6, a flow of the procedures performed in the pay program providing system 1 described above, the procedures by which information contained in a broadcast signal is stored in the recording portion 39 of the receiving apparatus 3, will be described.

During normal operations, the receiving apparatus 3 waits for a television program recording start instruction (step S1). The recording start instruction is given, for example, in the form of a predetermined button operation or remote control operation by the user, or in the form of a previously set recording start time. However, the recording start instruction may be given in any other way than is specifically described above.

When a recording start instruction is given (Y in step S1), the receiving apparatus 3 receives a broadcast signal broadcast by the television station 2 (step S2), and checks whether the broadcast signal thus received is a signal of a pay program or not (step S3). As described above, this checking is performed based on the pay program flag 13A contained in the broadcast signal.

If the broadcast signal thus received is found to be a signal of a pay program (Y in step S3), the receiving apparatus 3 makes the recording portion 39 record the control data 13 in addition to the video/audio data 16 contained in the broadcast signal (step S4). It is to be noted that the video/audio data 16 and the control data 13 received with identical timing are associated with each other and are then recorded. That is, when the video/audio data 16 thus recorded is played back, it is possible to read the control data 13 associated with the video/audio data 16.

On the other hand, if the broadcast signal thus received is found not to be a signal of a pay program (N in step S3), only the video/audio data 16 contained in the broadcast signal is recorded in the recording portion 39, and the control data 13 is not recorded (step S5). Alternatively, though the burden of processing slightly increases, it is also possible to record the control data 13 in addition to the video/audio data 16 in step S5.

The procedures from steps S2 to S5 are repeatedly performed until a recording stop instruction (for example, a predetermined button operation by the user) is given. When such an instruction is given, the procedures go back to step S1 (step S6). As described above, at the time of recording of a pay program, the video/audio data and the control data 13 are recorded simultaneously.

Figure 7:
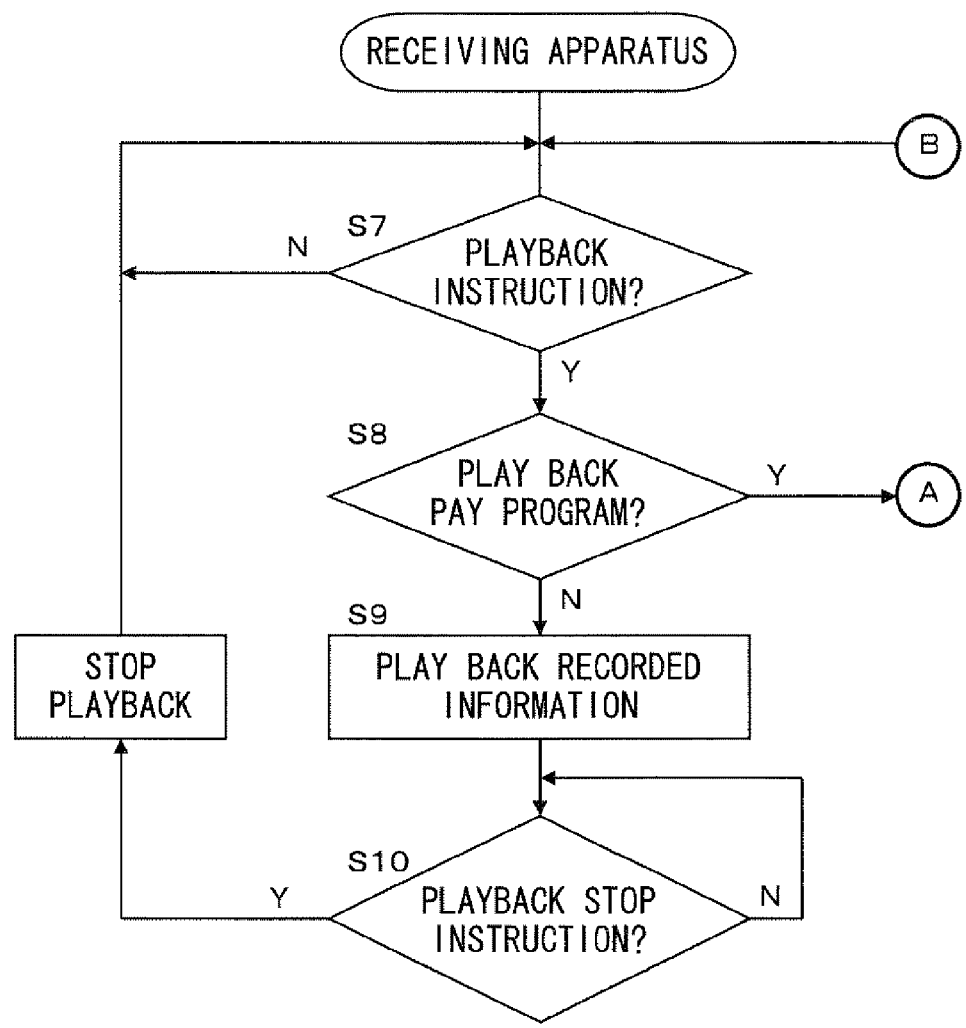
FIG. 7 is a flow chart showing the procedures for recording/playback according to an embodiment of the invention.
Figure 8:
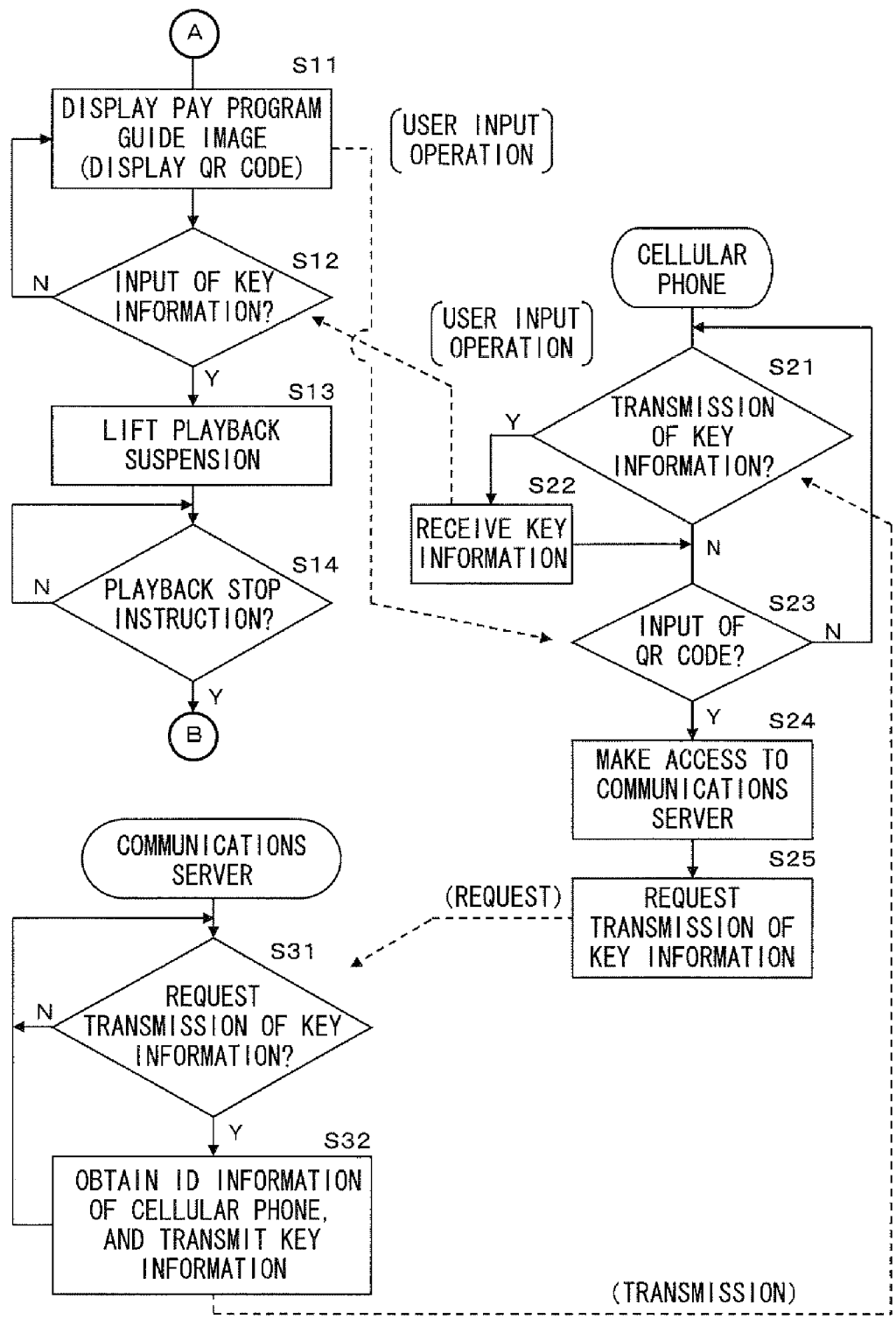
FIG. 8 is a flow chart showing the procedures for recording/playback according to the embodiment of the invention.

Next, with reference to the flow charts shown in FIGS. 7 and 8, a flow of the procedures performed in the pay program providing system 1, the procedures by which the program information (recorded information) recorded in the recording portion 39 is played back, will be described.

During normal operations, the receiving apparatus 3 waits for a recorded information playback instruction (step S7). The playback instruction is given, for example, in the form of a predetermined button operation or remote control operation by the user, or in the form of a previously set playback start time. However, the playback instruction may be given in any other way than is specifically described above.

When a playback instruction is given (Y in step S7), it is checked whether the recorded information whose playback is indicated by the instruction, that is, the recorded information to be played back, is information of a pay program or not (step S8). This checking is performed based on whether or not the control data 13 is recorded along with the recorded information, or based on the state of the pay program flag 13A in the control data 13.

If the recorded information to be played back is found not to be information of a pay program (N in step S8), playback of recorded information is performed (step S9). This allows the user to freely watch the recorded program (except for a pay program) with the receiving apparatus 3. Thereafter, the playback is continued until a playback stop instruction (for example, a predetermined button operation by the user) is given. When such an instruction is given, the procedures go back to step S7 (step S10).

On the other hand, if the recorded information to be played back is found to be information of a pay program (Y in step S8), the receiving apparatus 3 produces a display of a predetermined pay program guide image before playback of the recorded information (step S11). Playback of the recorded information is temporarily suspended during this display. In this way, a certain restriction is imposed on playback of the recorded pay program. This pay program guide image indicates the QR code 17 containing the encoded contents of the authentication site address 13B and the program identifying information 13D.

Here, an example of the pay program guide image is shown in FIG. 9. As shown in this figure, the pay program guide image includes not only the QR code 17 but also any one of the plurality of types of notification image described above.

The type of notification image is determined according to the notification image selection information 13C (or the program identifying information 13D) recorded in the recording portion 39. While the pay program guide image is displayed, the receiving apparatus 3 waits for input of key information required for lifting a suspension of playback of recorded information (step S12).

The receiving apparatus 3 may produce the QR code 17 as follows. The receiving apparatus 3 may produce the QR code 17 based on the control data 13 stored in the recording portion 39 at the time of playback of the recorded pay program (that is, at the time of playback of recorded information), or may produce the QR code 17 when the pay program is received and recorded in the recording portion 39, and record the QR code 17 thus produced in the recording portion 39 along with the video data or the like of the pay program (that is, produce and record the QR code 17 in advance before playback of the recorded information).

On the other hand, the cellular phone 4 waits for reception of the key information from the communications server 5 (step S21) and input of the QR code 17 via the imaging portion 42 (step S23). At this point, if the user scans the QR code 17 displayed in step S11 with the cellular phone 4 (Y in step S23), the cellular phone 4 decodes the contents of the QR code 17, and makes access to the communications server (a Web page of the authentication site) based on the address thus obtained (step S24).

Figure 10:
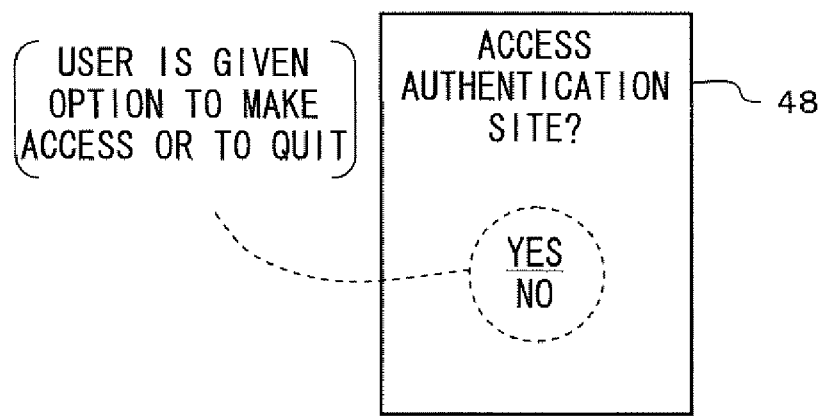
FIG. 10 is a diagram showing a screen display of the cellular phone embodying the invention.

During the transition from step S23 to step S24, the cellular phone 4, for example, may produce a display shown in FIG. 10 so as to allow the user to decide whether to make access to the authentication site. If the user decides not to make access to the authentication site, the data of the QR code 17 is discarded, and the procedures go back to step S21.

After step S24, the cellular phone 4 transmits the ID information assigned thereto or the program identifying information 13D obtained by decoding of the QR code 17 to the communications server 5, and makes a request of the communications server 5 to transmit key information to the cellular phone 4 (or a mail server or the like corresponding to the cellular phone 4) (step S25).

Figure 11:
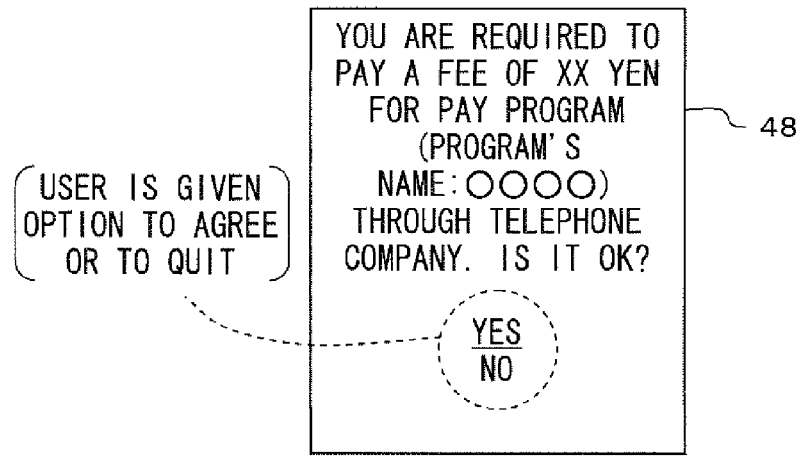
FIG. 11 is a diagram showing a screen display of the cellular phone embodying the invention.

During the transition from step S24 to step S25, the communications server 5 may make the cellular phone 4, for example, produce a display shown in FIG. 11 so as to see if the user has an intention of paying a viewing fee, for example. If the user does not have an intention of paying a viewing fee or watching the pay program, the procedures do not proceed to step S25.

On the other hand, the communications server 5 checks whether or not the cellular phone 4 requests the transmission of key information (step S31). If the request made in step S25 is found to be received (Y in step S31), the communications server 5 obtains the ID information of the cellular phone 4, and transmits the key information to the cellular phone 4 (or a mail server or the like corresponding to the cellular phone 4) (step S32). Here, it is assumed that the communications server 5 transmits the key information only when it can obtain the ID information of the cellular phone 4 successfully. In addition, the key information to be transmitted is identified by the type of authentication site accessed by the cellular phone 4, or the program identifying information 13D transmitted from the cellular phone 4.

Figure 12:
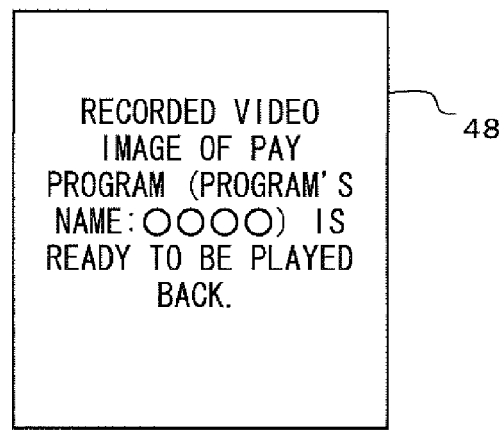
FIG. 12 is a diagram showing a screen display of the cellular phone embodying the invention.
Figure 13:
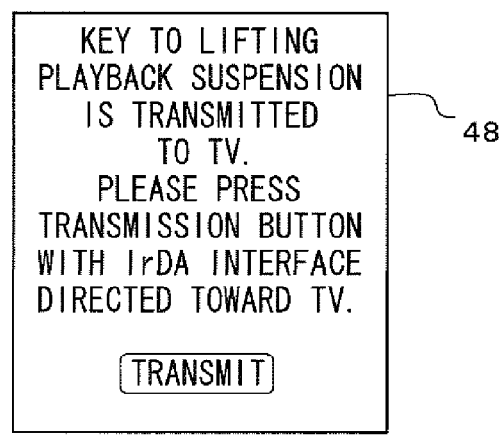
FIG. 13 is a diagram showing a screen display of the cellular phone embodying the invention.

If the key information is found to be transmitted in step S32 (Y in step S21), the cellular phone 4 receives the key information thus transmitted (step S22). At this point, the cellular phone 4 may produce a display shown in FIG. 12, for example, so as to notify the user of the current state. Then, the cellular phone 4 may produce a display shown in FIG. 13 so as to urge the user to transmit the key information to the receiving apparatus 3.

In addition, the communications server 5 may previously store software for making the cellular phone 4 produce a display shown in FIG. 11 so as to allow the user to decide whether to agree to pay a viewing fee of the pay program, and transmit the software to the cellular phone 4 if the communications server 5 is accessed from the cellular phone 4. This software may make the cellular phone 4 perform processing such as making the user decide whether to transmit the ID information of the cellular phone 4 to the communications server 5, or display an image for notifying the user that a viewing fee of the pay program can be paid by using fee collection services offered by the telephone company 6.

When the key information received by the cellular phone 4 is inputted to the receiving apparatus 3 via the IrDA interface (Y in step S12), the receiving apparatus 3 stops the display of the pay program guide image if the key information thus inputted is appropriate, and lifts a suspension of playback of the recorded information (step S13).

In step S12, the transmitted key information is checked for appropriateness. This checking is performed by checking, for example, whether or not the transmitted key information matches the information previously stored in the receiving apparatus 3. If the transmitted key information is found not to be appropriate, the procedures do not proceed to step S13, and input of the key information is continuously waited for.

As a result of the processing in step S13 being performed, the user is allowed to watch the previously stored pay program with the receiving apparatus 3 without restriction. Thereafter, the playback is continued until a playback stop instruction (for example, a predetermined button operation by the user) is given. When such an instruction is given, the procedures go back to step S7 (step S14).

The pay program provider charges the telephone company 6 a viewing fee of the pay program, the telephone company 6 with which the pay program provider makes an agreement about communication regarding the cellular phone 4, based on the ID information obtained from the cellular phone 4. In response to this request for payment, the telephone company 6 pays the viewing fee to the pay program provider, and takes the amount corresponding to the viewing fee from the bank account of the viewer (the subscriber using the cellular phone 4 identified by the ID information). In this way, the ID information of the cellular phone 4 is used for collecting a viewing fee of a pay program.

The pay program provider may collect the viewing fee in any other way than is specifically described above. For example, the pay program provider may collect the viewing fee (from the user) by using credit services offered by a business partner of the telephone company 6, or collect the viewing fee (from the user) by using electronic money services offered by a business partner of the telephone company 6.

Incidentally, the user can often make an agreement about credit services or electronic money services offered by a business partner of the telephone company 6 when making an agreement about the use of a cellular phone. In addition, by making an agreement about credit services or electronic money services at that point, unlike the conventional example, the user is allowed not only to record and play back a pay program but also to pay various fees without making an additional agreement for watching the television programs.

With the procedures described above, the viewer is allowed to record a pay program in the receiving apparatus 3 without making a subscription agreement or the like with the program provider in advance. Therefore, the pay program providing system 1 helps eliminate the inconvenience of failing to subscribe for a pay program in time and missing the recording of the pay program, for example.

In addition, the viewer can watch the pay program thus recorded simply by chiefly performing the following processing: reading the QR code from the receiving apparatus 3 with the cellular phone 4, obtaining the key information by making access to the communications server 5 from the cellular phone 4, and inputting the key information to the receiving apparatus 3. This makes it possible for the viewer to watch the pay program only by performing very simple operations.

The pay program provider can easily collect the viewing fee even when no subscription agreement or the like is made in advance with the viewer, because the pay program provider can obtain the ID information of the cellular phone 4 used by the viewer. That is, since the viewer of the pay program or the telephone company 6 with which the viewer makes an agreement can be identified based on the ID information, it is possible to collect the viewing fee later with ease.

This example deals with the receiving apparatus 3 that imposes restrictions on playback of the recorded pay program by suspending the playback until appropriate key information is inputted. Instead or in addition to this, it is also possible to scramble video data of a pay program, and descramble the video data when appropriate key information is inputted. For example, the video data may be descrambled by performing decoding for the video data by using appropriate key information. Alternatively, instead of suspending the playback of the recorded pay program, it is also possible to display a video image of the pay program with the above-described pay program guide image being superimposed on the whole or part thereof, and stop a display of the pay program guide image when the key information is inputted.

Furthermore, this example deals with a case in which the communications server 5 obtains the ID information from the cellular phone 4. It is to be understood, however, that the communications server 5 may obtain instead information of any other type by which an individual or organization can be identified. For example, the communications server 5 may obtain owner identifiable information such as name, address, or subscriber's number of an owner of a cellular phone (a subscriber making an agreement about the use of a communication line) that has previously been stored in the cellular phone 4. This makes it easy for the pay program provider to charge the owner of the cellular phone a viewing fee.

Example 2

Next, Example 2 of the invention will be described. This example differs from Example 1 only in the contents of stream data transmitted from the television station 2 and matters concerning a display of the pay program guide image in the receiving apparatus 3. In other respects, the configuration of Example 2 is basically the same as that of Example 1, and overlapping explanations will be omitted.

Figure 14:
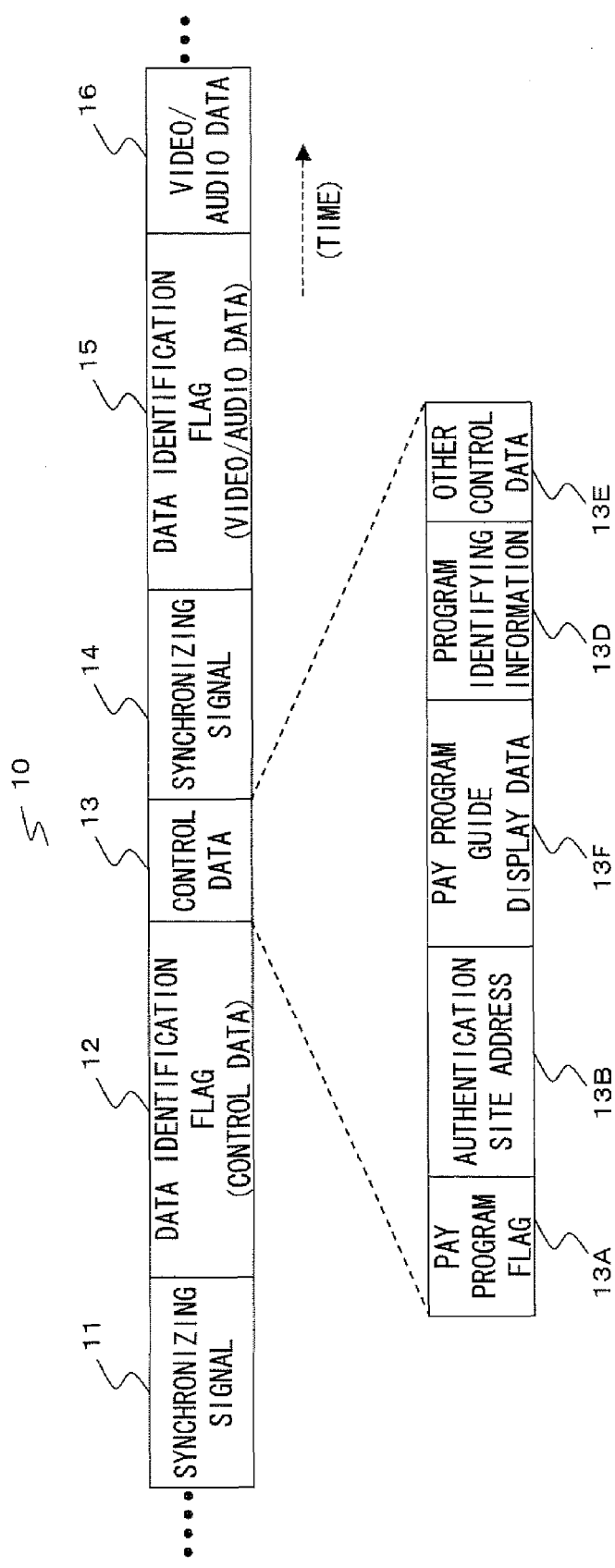
FIG. 14 is a diagram showing an outline of the structure of stream data in Example 2 of the invention.

The contents of stream data of this example is shown in FIG. 14. The stream data 10 of this example differs from that of Example 1 in that pay program guide display data 13F is inserted in place of the notification image selection information 13C. This pay program guide display data 13F corresponds to data for displaying a pay program guide image of Example 1.

That is, in Example 1, the receiving apparatus 3 previously stores a plurality of data for a notification image (a portion of a pay program guide image outside the QR code 17), and displays one of them according to the contents of the notification image selection information 13C; in this example, data for a notification image itself is received from the television station 2.

As a result, in this example, as compared with Example 1, although the proportion of the control data 13 to the stream data 10 increases, it is possible to enhance the flexibility of the contents of the pay program guide image. This makes it possible to display a more accurate, more detailed pay program guide image according to the contents and type of a program.

Example 3

Next, Example 3 of the invention will be described. This example differs from Example 1 only in that key information is encrypted. In other respects, the configuration of this example is basically the same as that of Example 1, and overlapping explanations will be omitted.

In this example, key information transmitted from the cellular phone 4 to the receiving apparatus 3 by using infrared communication is encrypted by a public key encryption-based encryption scheme. It is to be noted that public key encryption is an encryption scheme in which a public key and a private key are used in a pair, and to decrypt the information encrypted with a public key requires a corresponding private key. An example of the public key encryption is an RSA scheme using the difficulties of factorization into prime factors.

Figure 15:
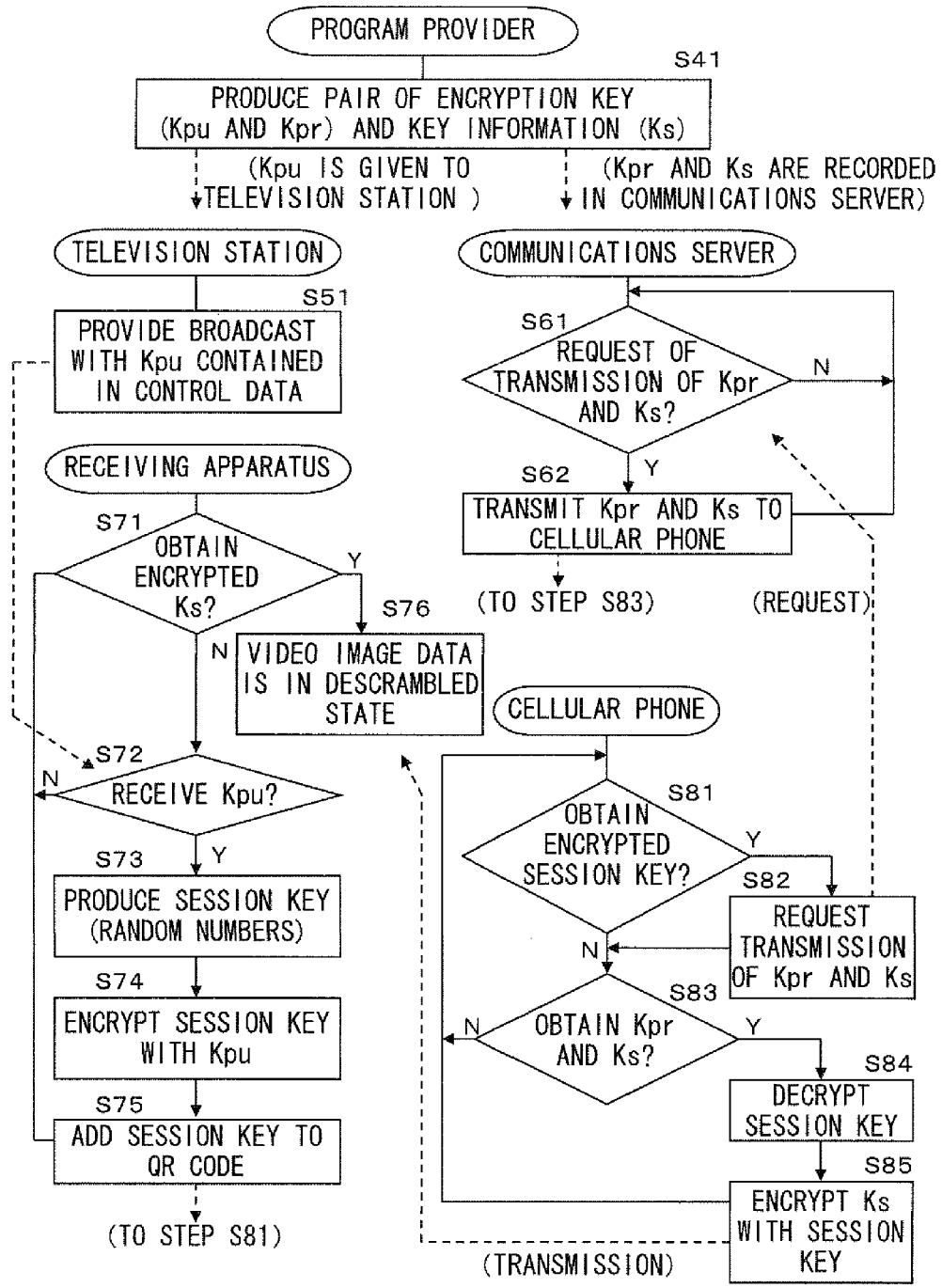
FIG. 15 is a flow chart showing the procedures for encryption of key information according to the embodiment of the invention.

Hereinafter, with reference to a flow chart shown in FIG. 15, the procedures of this example will be described. First, the program provider produces a public key (hereinafter "Kpu", if necessary) and a private key (hereinafter "Kpr", if necessary) used in a pair, and key information (hereinafter "Ks", if necessary) required for lifting the restriction imposed on the playback of the recorded pay program, which has been described in Example 1. Then, Kpu is given to the television station 2, and Kpr and Ks are stored in the communications server 5 (step S41).

The television station 2 provides a broadcast with Kpu contained in the control data 13 (step S51). On the other hand, the communications server 5 checks whether or not the cellular phone 4 requests the transmission of Kpr and Ks (S61). If the transmission request is found to be made, the communications server 5 transmits Kpr and Ks to the cellular phone 4 (step S62). Note that steps S61 and S62 correspond to steps S31 and S32 in Example 1, respectively.

Upon receiving Kpu from the television station 2 (step S72), the receiving apparatus 3 produces a session key (random numbers) (step S73). The receiving apparatus 3 encrypts the session key with Kpu (step S74), and adds the encrypted session key to the QR code 17 (step S75).

Upon reading the QR code via the imaging portion 42, the cellular phone 4 obtains the encrypted session key (Y in step S81). Thereafter, the cellular phone 4 requests the transmission of Kpr and Ks when making access to the communications server 5 (step S82). In response to this request, as described above, the communications server 5 transmits Kpr and Ks to the cellular phone 4 (step S62). Note that steps S81 and S82 correspond to steps S23 and S25 in Example 1, respectively.

Here, SSL (secure socket layer) is employed to provide a high level of security for communications (steps S82 and S62) between the cellular phone 4 and the communications server 5. In these communications, as is the case with Example 1, the communications server 5 obtains the ID information of the cellular phone 4.

At the time of completion of processing in step S62, the cellular phone 4 has the session key encrypted with Kpr, and Kpu and Ks. Therefore, the cellular phone 4 first decrypts (decodes) the encrypted session key by using Kpu (step S84), and then encrypts Ks by using the decoded session key (step S85).

When the encrypted Ks is transmitted to the receiving apparatus 3 by infrared communication (Y in step S71), the receiving apparatus 3 decrypts the encrypted Ks and obtains Ks. Thereafter, the receiving apparatus 3 lifts the restriction imposed on the playback of the recorded pay program by using Ks (step S76). Incidentally, the encrypted Ks can be decrypted by the receiving apparatus 3 as long as the receiving apparatus 3 and the cellular phone 4 are consistent with each other in terms of an encryption/decryption scheme, because the session key is produced by the receiving apparatus 3 itself. In addition, it is possible to offer a higher level of security by making the receiving apparatus 3 produce the session key each time (for example, every time one set of transmission and reception of a session key is performed). Note that steps S71 and S76 correspond to steps S12 and S13 in Example 1, respectively.

As described above, since the key information is encrypted with a session key when it is transmitted from the cellular phone 4 to the receiving apparatus 3 via infrared communication, it is possible to prevent an unauthorized person from obtaining the key information by using, for example, a universal remote. In addition, since the session key added to the QR code is encrypted with Kpu, it is possible to prevent an unauthorized person from obtaining it.

CONCLUSION

An outline of the system embodying the invention described above will be briefly shown in FIG. 16. As described above, according to the pay program providing system 1, the receiving apparatus 3 lifts the restriction (a suspension of playback, a superimposing of a certain image on the whole or part of the recorded video image, or scrambling of the recorded video image) imposed on playback of the recorded video image of the pay program only when predetermined key information is inputted. In addition, the communications server 5 transmits the key information to the cellular phone 4 or the like that has transmitted the ID information or the like to the communications server 5.

As a result, the pay program provider managing the communications server 5 can easily perform operations such as identification of the viewer by obtaining the ID information or the like. Furthermore, since the key information is transmitted in exchange for the reception of the ID information or the like, it is possible to urge the user to transmit the ID information or the like. In addition, the viewer is allowed to record the pay program quickly even when no subscription agreement or the like is made in advance with the pay program provider.

Although an embodiment of the invention has been described above, the invention may be practiced in any other manner than specifically described above, with any modification or variation made within the spirit of the invention. All examples described above, whenever applicable, can be combined with any other examples.

According to the broadcast receiving apparatus and the pay program providing system according to the invention, it is possible to display address information at the time of playback of a recorded video image (a video image recorded in the recording portion) of a pay program. This makes it easy to restrict playback of the recorded video image until, for example, the user is made to make access to the communications server managed by the pay program provider and obtain a key to lifting the restriction from the communications server. As a result, the pay program provider can easily collect the viewing fee by obtaining information that identifies the user or the like in exchange for the key to lifting the restriction. In addition, the viewer is allowed to record the pay program even when no subscription agreement or the like is made in advance.

What is claimed is:

1. A pay program providing system, comprising:
a broadcast receiving apparatus receiving a broadcast signal containing video image information representing a video image, pay program identifying information indicating whether or not the video image is a pay program video image, and address information indicating a predetermined communications server, the broadcast signal containing the video image information, the pay program identifying information, and the address information in a predetermined format, the broadcast receiving apparatus comprising:
a display portion displacing the video image;
a pay program judging portion judging whether or not the video image information is pay program video image information based on the pay program identifying information;
a recording portion recording the video image information, wherein, if the pay program judging portion judges that the video image information is pay program video image information, the recording portion records the address information in addition to the video image information;
a matrix barcode producing portion producing, based on the address information, a matrix barcode indicating the address information;
a video image playback portion making the display portion play back the video image of the video image information recorded in the recording portion according to a playback start instruction;
a pay program guide displaying portion producing a display of a predetermined pay program guide image if the video image to be played back is a pay program video image, wherein
the pay program guide displaying portion produces a display of the pay program guide image including the matrix barcode, and
if the video image to be played back is a pay program video image, the video image playback portion temporarily suspends playback of the video image;
a communications terminal that can read a matrix barcode, and that stores identifiable information by which an individual or organization can be identified; and
a communications server having a key required to lift a suspension of playback, wherein the pay program providing system performs
a first step in which the communications terminal reads the matrix barcode displayed by the broadcast receiving apparatus, and makes access to a communications server identified by the address information,
a second step in which the communications server transmits the key to the communications terminal only when the communications server receives the identifiable information from the communications terminal,
a third step in which the communications terminal transmits the key to the broadcast receiving apparatus, and
a fourth step in which the broadcast receiving apparatus lifts a suspension of playback when obtaining the key.

2. The pay program providing system of claim 1,
wherein the communications terminal is a cellular phone owned by a subscriber making an agreement with a telephone company about a use of a communication line,
wherein the identifiable information is information by which the subscriber can be identified.

3. The pay program providing system of claim 1,
wherein the identifiable information is ID information unique to the communications terminal.

4. The pay program providing system of claim 1,
wherein the communications terminal performs a decision process for making a user decide whether to transmit the identifiable information to the communications server.

5. The pay program providing system of claim 1,
wherein, if the first step is performed, the communications server transmits software to the communications terminal, wherein the software makes the communications terminal perform the decision process.

6. The pay program providing system of claim 5,
wherein the software makes the communications terminal perform a process for making the user decide whether to agree to pay a viewing fee of a pay program.

7. The pay program providing system of claim 5,
wherein the software makes the communications terminal display an image for notifying the user that the viewing fee of the pay program can be paid by using fee collection services offered by a cellular phone company.

8. The pay program providing system of claim 1,
wherein the identifiable information obtained by the communications server is used for collecting the viewing fee of the pay program.

9. The pay program providing system of claim 1,
wherein, in the third step, transmission of the key is performed via infrared communication using an IrDA interface.

10. The pay program providing system of claim 1,
wherein the key is an encrypted key,
wherein the broadcast receiving apparatus decrypts the encrypted key.

11. A pay program providing system, comprising:
a broadcast receiving apparatus receiving a broadcast signal containing video image information representing a video image, pay program identifying information indicating whether or not the video image is a pay program video image, and address information indicating a predetermined communications server, the broadcast signal containing the video image information, the pay program identifying information, and the address information in a predetermined format, the broadcast receiving apparatus comprising:
a display portion displacing the video image;
a pay program judging portion judging whether or not the video image information is pay program video image information based on the pay program identifying information;
a recording portion recording the video image information, wherein, if the pay program judging portion judges that the video image information is pay program video image information, the recording portion records the address information in addition to the video image information;
a matrix barcode producing portion producing, based on the address information, a matrix barcode indicating the address information;
a video image playback portion making the display portion play back the video image of the video image information recorded in the recording portion according to a playback start instruction;

a pay program guide displaying portion producing a display of a predetermined pay program guide image if the video image to be played back is a pay program video image, wherein
the pay program guide displaying portion produces a display of the pay program guide image including the matrix barcode, and
the pay program guide displaying portion produces a display in which the pay program guide image is superimposed on a whole or part of the video image of the video image information;
a communications terminal that can read a matrix barcode, and that stores identifiable information by which an individual or organization can be identified; and
a communications server having a key required to stop a display of the pay program guide image,
wherein the pay program providing system performs
a first step in which the communications terminal reads the matrix barcode displayed by the broadcast receiving apparatus, and makes access to a communications server identified by the address information,
a second step in which the communications server transmits the key to the communications terminal only when the communications server receives the identifiable information from the communications terminal,
a third step in which the communications terminal transmits the key to the broadcast receiving apparatus, and
a fourth step in which the broadcast receiving apparatus stops a display of the pay program guide image when obtaining the key.

12. A pay program providing system, comprising:
a broadcast receiving apparatus receiving a broadcast signal containing video image information representing a video image, pay program identifying information indicating whether or not the video image is a pay program video image, and address information indicating a predetermined communications server, the broadcast signal containing the video image information, the pay program identifying information, and the address information in a predetermined format, the broadcast receiving apparatus comprising:
a display portion displacing the video image;
a pay program judging portion judging whether or not the video image information is pay program video image information based on the pay program identifying information;
a recording portion recording the video image information, wherein, if the pay program judging portion judges that the video image information is pay program video image information, the recording portion records the address information in addition to the video image information;
a matrix barcode producing portion producing, based on the address information, a matrix barcode indicating the address information;
a video image playback portion making the display portion play back the video image of the video image information recorded in the recording portion according to a playback start instruction;
a pay program guide displaying portion producing a display of a predetermined pay program guide image if the video image to be played back is a pay program video image, wherein
the pay program guide displaying portion produces a display of the pay program guide image including the matrix barcode;
the broadcast receiving apparatus receiving a broadcast signal containing video image information representing a scrambled video image, pay program identifying information indicating whether or not the video image is a pay program video image, and address information indicating a predetermined communications server, the broadcast signal containing the video image information, the pay program identifying information, and the address information in a predetermined format;
a communications terminal that can read a matrix barcode, and that stores identifiable information by which an individual or organization can be identified; and
a communications server having a key required to descramble the video image, wherein the pay program providing system performs
a first step in which the communications terminal reads the matrix barcode displayed by the broadcast receiving apparatus, and makes access to a communications server identified by the address information,
a second step in which the communications server transmits the key to the communications terminal only when the communications server receives the identifiable information from the communications terminal,
a third step in which the communications terminal transmits the key to the broadcast receiving apparatus, and
a fourth step in which the broadcast receiving apparatus descrambles the video image by using the key.

* * * * *